United States Patent
Gudgel et al.

(10) Patent No.: US 8,487,755 B2
(45) Date of Patent: Jul. 16, 2013

(54) METHOD FOR IDENTIFYING AND LOCATING WIRELESS DEVICES ASSOCIATED WITH A SECURITY EVENT INCLUDING AN EXPLOSION OR GUNSHOT

(75) Inventors: Judson Mannon Gudgel, Tulsa, OK (US); Jonathan D. Fairchild, Broken Arrow, OK (US); Martin Alan Moon, Tulsa, OK (US); Reed Jules Oppenheimer, Tulsa, OK (US)

(73) Assignee: GWACS Defense, Inc., Tulsa, OK (US)

( * ) Notice: Subject to any disclaimer, the term of this patent is extended or adjusted under 35 U.S.C. 154(b) by 536 days.

(21) Appl. No.: 12/601,182

(22) PCT Filed: May 21, 2008

(86) PCT No.: PCT/US2008/064379
§ 371 (c)(1),
(2), (4) Date: May 20, 2010

(87) PCT Pub. No.: WO2009/005907
PCT Pub. Date: Jan. 8, 2009

(65) Prior Publication Data
US 2010/0245079 A1   Sep. 30, 2010

Related U.S. Application Data

(60) Provisional application No. 60/939,214, filed on May 21, 2007.

(51) Int. Cl.
*G08B 21/00* (2006.01)
(52) U.S. Cl.
USPC .................. 340/539.1; 340/540; 455/404.2

(58) Field of Classification Search
USPC ................ 340/539.1, 539.13, 539.26, 540, 340/573.1; 455/404.1, 404.2, 414.1; 726/2–4, 726/22, 23; 367/128
See application file for complete search history.

(56) References Cited

U.S. PATENT DOCUMENTS

| | | | |
|---|---|---|---|
| 6,005,367 A | 12/1999 | Rohde | |
| 7,233,781 B2 * | 6/2007 | Hunter et al. | 455/404.1 |
| 2001/0011355 A1 | 8/2001 | Kawai | |
| 2003/0175560 A1 | 9/2003 | Kim et al. | |
| 2004/0107219 A1 * | 6/2004 | Rosenberger | 707/104.1 |
| 2006/0108979 A1 | 5/2006 | Daniel et al. | |

FOREIGN PATENT DOCUMENTS

| | | |
|---|---|---|
| EP | 1253663 A1 | 10/2002 |
| EP | 1786057 A2 | 5/2007 |
| WO | 00/45279 A1 | 8/2000 |

* cited by examiner

*Primary Examiner* — Jeffery Hofsass
(74) *Attorney, Agent, or Firm* — Mossman, Kumar & Tyler, PC

(57) ABSTRACT

Wireless devices are often associated with security events. The security events may be investigated by identifying and locating the associated wireless devices by: 1) determining a time and a location of a security event; 2) accessing a first wireless network and determining at least one of an ID and a location for at least a first wireless device within a predetermined proximity of the security event; and 3) determining at least one of an ID and a location for a second wireless device that was in communication with the first wireless device within at least one of: a predetermined span of time prior to or concurrent with the time of the security event, and a predetermined proximity to the security event.

5 Claims, 1 Drawing Sheet

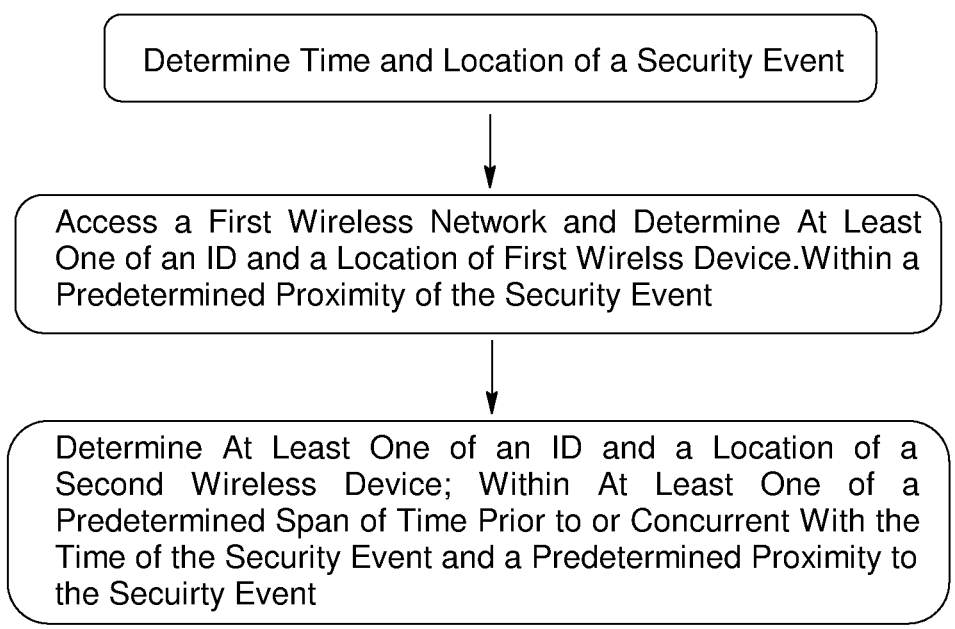

METHOD FOR IDENTIFYING AND LOCATING WIRELESS DEVICES ASSOCIATED WITH A SECURITY EVENT INCLUDING AN EXPLOSION OR GUNSHOT

BACKGROUND OF THE INVENTION

1. Technical Field

The present invention relates to a security event. The present invention particularly relates to a security event and the location and identification of wireless devices associated with the security event.

2. Background of the Art

A few large cities have become plagued with gunfire. This gunfire may be both related and unrelated to the criminal community. For example, gunfire associated with celebrations has been known to cause injury and death. Similarly, gunfire associated with gang activity may be slow to be reported to the authorities resulting in loss of life due to delays in getting medial attention to injured victims Some of the cities have adopted location systems that have proven effective in the location of the gunfire. Such systems, sometimes referred to as "gunshot detection systems" are generally known and available. Such systems can be used to detect the source of an acoustic event, the radial direction of an event and/or the general proximity of an event.

Gunfire is not the only basis of concern to security organizations. Explosions now have become a fact of life in some cites. The threat of explosions, including explosions that release harmful materials such as radiation, toxic chemicals, and dangerous biological materials is also a concern.

Explosions are often remotely controlled through the use of wireless devices. Even gunfire may involve wireless devices. For example, a sniper may be much more effective if the sniper's fire is directed. An explosive device may be much more effective if it can be activated when a target is in close proximity. Wireless devices such as cell phones, pagers, and radio transceivers are often used for these purposes.

SUMMARY OF THE INVENTION

In one aspect, the invention is a method for identifying and locating wireless devices associated with a security event comprising the steps of: 1) determining a time and a location of a security event; and 2) accessing a first wireless network and determining at least one of an ID and a location for at least a first wireless device within a predetermined proximity of the security event.

In another aspect, the invention is such a method further comprising 3) determining at least one of an ID and a location for a second wireless device that was in communication with the first wireless device within at least one of: a predetermined span of time prior to or concurrent with the time of the security event, and a predetermined proximity to the security event.

In yet another aspect the invention is a method for threat monitoring comprising the steps of: 1) determining a location of interest; and 2) accessing at least a one wireless network and determining within a predetermined proximity of the location interest at least one of: a location of a wireless device, and an ID for a wireless device.

BRIEF DESCRIPTION OF THE DRAWINGS

The invention is further defined by the accompanying drawings, wherein like numerals refer to like parts throughout, and in which:

FIG. 1 is a flow chart showing the steps of one embodiment of the invention as claimed in claims 1 and 2.

DETAILED DESCRIPTION OF THE INVENTION

In one embodiment, the invention is a method for identifying and locating wireless devices associated with a security event. For the purposes of the present invention, a security event is an event that can result in the loss of life, the destruction of property, or the disruption of commercial activities; and is of interest to police or military organizations.

The method of the present invention includes determining a time and a location of a security event. This may be preformed using prior art systems. For example, one such prior art system is that disclosed in U.S. Pat. No. 5,973,998 to Showen, et al., which is fully incorporated herein by reference. Another such system is that of the system disclosed in U.S. Pat. No. 6,847,587 to Patterson, et al., which is fully incorporated herein by reference. Similarly the method of the present invention may be practiced using at least some of the components of the systems disclosed in U.S. Pat. Nos. 5,703,835 to Sharkey, et al., and U.S. Pat. No. 5,455,868 to Sergent, et al., which are both fully incorporated herein by reference.

The method of the invention includes accessing a first wireless network and determining at least one of an ID and a location for at least a first wireless device within a predetermined proximity of the security event. In this part of the method of the invention, the term wireless network means either: 1) A commercial communications networks such as those that provide cell phone or pager services, or 2) a network of sensors in wireless communication with each other and/or a central controller that allow the determination of the location of a wireless device.

When the wireless network is a commercial network, then access to the network may be used to access both ID and location of the wireless device. This is most often done by using the networks system of tracking the devices proximity to nearby communication installations. For example, in the case of a cell phone, the cellular system will track activated phones, even when they are on standby, so that when a call is sent or received, the nearest cell tower having the best reception to that device can be used.

In one embodiment, the wireless device will include a GPS receiver which will allow for the direct reporting by the wireless device as to its location. Any method known to be useful finding the location of a wireless device known to be useful may be used with the present invention.

In the practice of the method of the invention, it is sometimes desirable to be able to determine the identification (ID) of a wireless device. Certain information is transmitted by the device when the wireless device is a cell phone. For example, a mobile identification number uniquely identifies a mobile unit within a wireless carrier's network. Also available is the electronic serial number which is the unit number assigned by a phone manufacturer. Other devices use analogous information which then can be indexed against the records of the service provider to get the name, address and any other information which the provider may have available.

The method of the invention includes a predetermined proximity for a security event. Stated another way, for any security event, the proximity of interest for determining the location and/or ID of a wireless device may be a function of the type of a security event. Wireless devices of interest can be used in at least two ways, also depending upon the type of security event. For example, if the security event is an explosion, then one type of wireless device of interest may be the device used to activate a detonator, such as blasting cape, in order to set off the explosive. Another type of wireless device that may be of interest is a wireless device used to activate a second wireless device including a detonator. For example in one embodiment of the invention, both a cell phone attached to blasting caps and an explosive, and a cell phone used to call the first cell phone to activate the blasting caps would be of interest to a security organization.

For a wireless device attached to an explosive or being held by a sniper, the proximity to the security event would be limited to the margin of error in defining the location of the security event. For wireless devices used to activate the detonating wireless device, or provide information to a sniper, then the proximity will be more, often more than 50 yards, but less than 2 miles.

If a commercial provider is used to locate the position of a wireless device, then it is likely that additional information such as the device owner's name, address, and the like may be available. If the network is a network of sensors, then unless the network is preprogrammed with the appropriate encryption algorithms, then location may be all that is available.

In analyzing the data available regarding wireless devices in proximity to a security event, for an explosion, the most significant data point may be determining what devices were in the same location as the event and ceased to function at the same time as the occurrence of the event. Of interest will be any device that was in communication with such a device. For a sniping event, there will not be a cessation of operation, but at least one wireless device will be in close proximity and the second will be in communication with the first. If the event occurs in a city, there may be, by coincident, more than one set of devices that meet rise to the level of being of interest. In such an event, then conventional investigational techniques may be used to determine which set was the one involved with the indecent. It goes without saying that while two wireless devices are discussed, there may be three or more wireless devices involved.

While the wireless devices may be the same, they do not have to be the same. For example, a cell phone may be used to contact a wireless pager to activate a detonator. In the alternative, portable computers may be used to send and or receive spotting information for a sniper. A portable device such as a BlackBerry® may be used as well. All such wireless devices would be of interest. Where the types of devices are diverse, then more than a single commercial wireless network may also be involved and thereby require access in the practice of the invention.

In addition to gunshots, security events may include, but not be limited to a release of biological materials such as anthrax, a "dirty explosion" including the broadcasting of radioactive materials, a nuclear explosion, and an electromagnetic pulse attack against sensitive infrastructure.

In the practice of the invention, the determining of the time and location of a security event may be performed using conventional intelligence gathering. Preferably, it is done using an automatic sensor array. The longer the period of time between the security event and the identification and/or location of wireless devices of interest, then the further away suspects may be. More importantly, the holding of the devices of interest may be an important piece of evidence in regard to investigating the security event, and as time passes, the opportunities for the suspects to discard the wireless devices increases. If follows then that in a preferred embodiment, the time and location of the security event is determined using an automatic systems such as that disclosed in U.S. Pat. No. 6,847,587 to Patterson, et al. In such application, the identification of the wireless devices could be done in real time greatly increasing the opportunity for security forces to location suspects still holding the wireless devices thereby incriminating themselves.

In one embodiment of the invention, the location of a wireless device and/or its identification information will allow security organizations to identify a suspect. The method the invention may be used to further provide the security organization with assistance in tracking the suspect's movements.

In addition to be useful in investigation, the method of the invention is also useful in threat monitoring. Threat monitoring, or stated another way, the prevention of security events, can be performed using the method of the invention in a number of ways.

For example when a wireless device is used to activate a detonator for a bomb, it will necessarily be attached to the bomb. If the bomb is placed into an area that is normally subject to traffic, then the identification of a wireless device that becomes stationary for an unusually long time may be suspicious.

In another embodiment, if a wireless device is held by a person on a list of suspects, then the location of that wireless device in close proximity to an area that is the subject of high security vigilance could be a basis for investigating the person holding the device. This is especially true for a situation where such a device is observed being moved towards what could be considered a vulnerable target such as that set forth in detail in Example 2.

The location of interest for threat monitoring include, but is not limited to, convoy routes, military installations, sporting event venues, entertainment venues, places of worship, hotels having political figures as guests, points of revenue generation such as oil production and transportation facilities, and the like.

The following example is provided to more fully illustrate the invention. As such, it is intended to be merely illustrative and should not be construed as being limitative of the scope of the invention in any way. Those skilled in the art will appreciate that modifications may be made to the invention as described without altering its scope.

EXAMPLES

Hypothetical Example 1

A sniper fires at a member of a squad of soldiers. The squad is equipped with a system that allows for an immediate determination of the location of the sniper. The location of the sniper at the time of the attack is transmitted to the squad whereupon some members take cover and other members take actions to neutralize the sniper. Concurrent with this, the method of the invention is employed to determine that the sniper is using a cell phone and that his cell phone was contacted two minutes prior to the attack by another cell phone. After the attack, the holder of the second cell phone is tracked and arrested.

Hypothetical Example 2

An explosive device, which includes a cell phone as a component in the detonator for the device, is placed within a garbage can alongside a road. The road is a location of interest because it is a military convoy route. It is noted that a cell phone signal is located adjacent to the road and does not move for 10 minutes. A convoy is redirected while the location of the bomb is investigated. The bomb is disarmed.

Hypothetical Example 3

A VIP is expected at a location and the location is put under surveillance prior to the arrival of the VIP. A cell phone belonging to a person of interest is detected in close proximity to the location. The person of interest is located and interviewed and then removed from the location.

What is claimed is:

1. A method for identifying and locating wireless devices associated with a security event comprising:
   determining a time and a location of a security event; and
   accessing a first wireless network and determining at least one of an ID and a location for at least a first wireless device within a predetermined proximity of the security event;
wherein the security event is an explosion or gunshot.

2. The method of claim 1 further comprising:
   determining at least one of an ID and a location for a second wireless device that was in communication with the first wireless device within at least one of: a predetermined span of time prior to or concurrent with the time of the security event, and a predetermined proximity to the security event.

3. The method of claim 1 wherein the wireless network is commercial communications network.

4. The method of claim 3 wherein the commercial communications network is a cell phone network.

5. The method of claim 3 wherein the commercial communications network is a pager network.

* * * * *